Nov. 2, 1943.    T. RAPP    2,333,338
VIBRATING CONVEYER TROUGH
Filed March 19, 1941
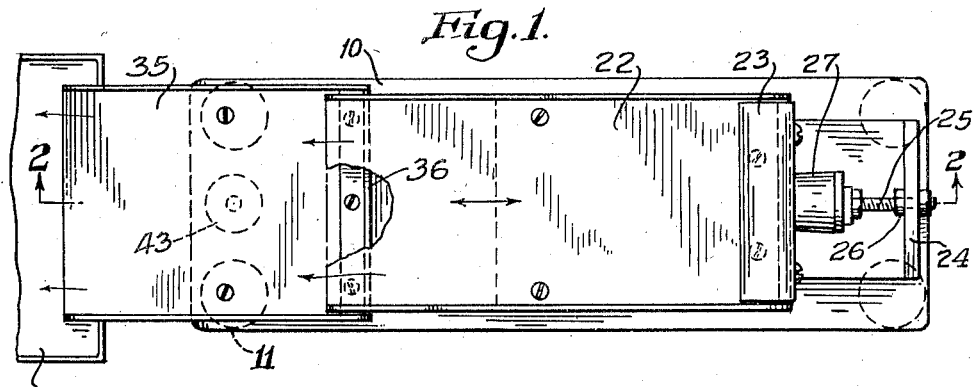
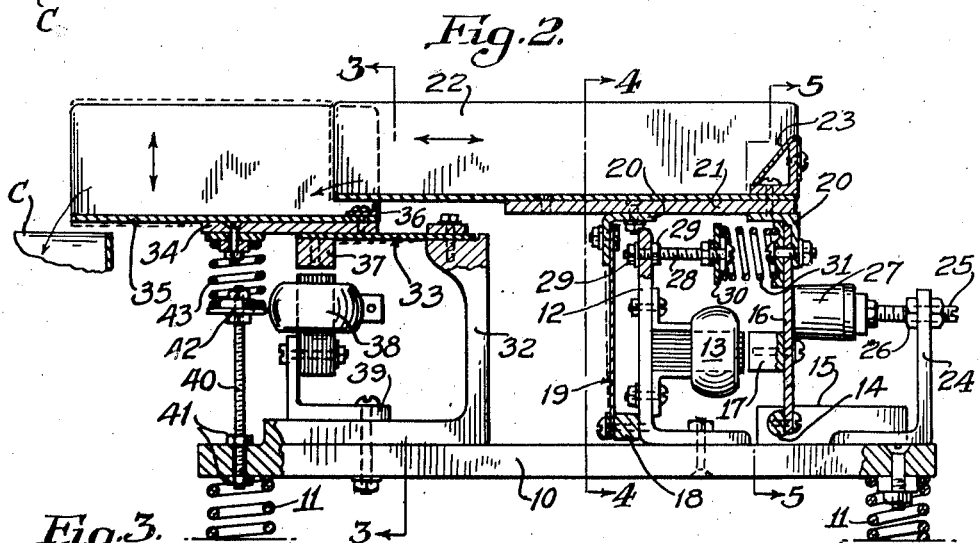
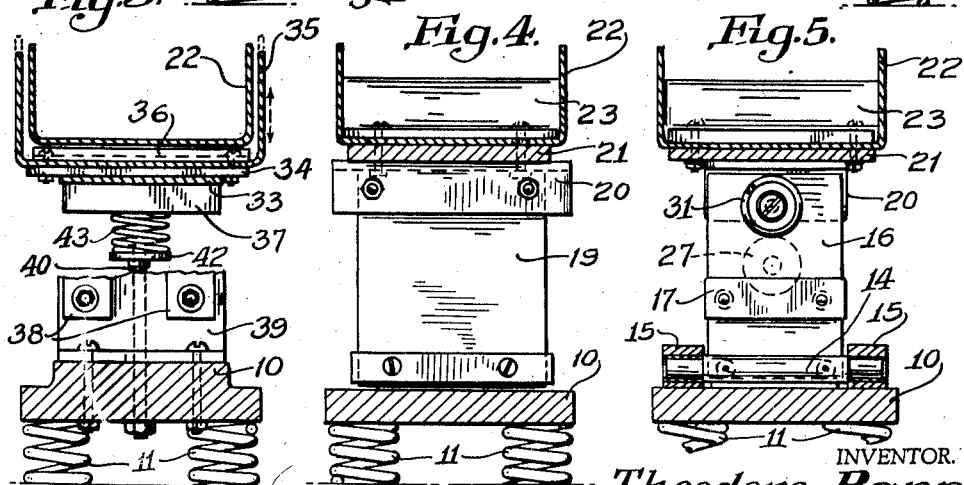
INVENTOR.
Theodore Rapp
BY
ATTORNEY.

Patented Nov. 2, 1943

2,333,338

UNITED STATES PATENT OFFICE 2,333,338

VIBRATING CONVEYER TROUGH

Theodore Rapp, Los Angeles, Calif.

Application March 19, 1941, Serial No. 384,130

13 Claims. (Cl. 198—220)

My invention relates generally to weighing and packaging machines and more particularly to a vibrating conveyer trough utilized for feeding various products or material to receptacles or containers carried or supported by the beam of a scale, and the principal object of my invention is, to provide a relatively simple, practical and inexpensive conveyer trough and vibrating means therefor, and which trough is constructed in two parts, one part being disposed directly in advance of the other part, with means for imparting longitudinal vibratory movement to the rear part of the trough and the forward part of the trough being provided with means for vibrating the same vertically so that the product that is being vibrated vertically in the forward part of the trough will be caused to flow forwardly and discharge from the forward end of said forward trough by the forward flow of the product through the rear part of the trough which is vibrated longitudinally.

A further object of my invention is to provide a two-part conveyer trough of the character referred to and to mount the parts thereof on independent electrically actuated vibrating means and to combine with said vibrating means, readily adjustable parts for controlling the action of the vibratory means in order to obtain and bring about accurate control and regulation of the flow of product through the trough, and likewise accurately regulating the discharge of the product from the forward end of the forward trough and consequently attaining increased accuracy in the weight of the product that is delivered into the receptacles or containers carried by the scale beam.

A further object of my invention is, to provide a vibrating trough that may be employed with equal advantage in the handling of products wherein the individual pieces or particles have approximately the same size and shape and with comparatively smooth surfaces so as to flow freely through the trough, and also product where the individual pieces or particles are irregular in size and shape and which tend to interlock or hang together during their travel through the vibrating conveyer.

With the foregoing and other objects in view, my invention consists in certain novel features of construction and arrangement of parts that will be hereinafter more fully described and claimed and illustrated in the accompanying drawing in which:

Fig. 1 is a top plan view of a vibrating conveyer trough constructed in accordance with my invention.

Fig. 2 is a vertical longitudinal section taken on the line 2—2 of Fig. 1.

Fig. 3 is a cross section taken on the line 3—3 of Fig. 2.

Fig. 4 is a cross section taken on the line 4—4 of Fig. 2.

Fig. 4 is a cross section taken on the line 5—5 of Fig. 2.

Referring by numerals to the accompanying drawing which illustrate a preferred embodiment of my invention, 10 designates a base that is supported by suitable cushioning means, for instance, coil springs 11.

Secured to and projecting upwardly from the rear portion of base 10 is a bracket 12 and mounted on the rear side of said bracket is a conventional electromagnet 13. Arranged to the rear of bracket 12 and disposed transversely above the base 10 is a rock shaft 14, the ends thereof being journalled for rotation in bearings 15 that are mounted on base 10. Suitably secured to this rock shaft is an upright plate 16 and secured on the front face thereof directly in line with the core of the electromagnetic 13 is an armature 17.

Secured on the front face of bracket 12 near its lower end is a transversely disposed bar 18 and secured thereto is the lower end of an upright plate 19 of resilient metal.

Secured to the upper ends of plate 16, which is practically inflexible, and to the upper end of resilient plate 19, are transversely disposed angle bars 20, which serve as supports for a horizontally disposed plate 21. Secured to this plate 21 is the rear portion of a horizontally disposed conveyer trough 22 that is substantially U-shape in cross section and arranged in the rear portion of this trough between the side walls thereof is a rear wall 23. A substantial portion of trough 22 projects forwardly from the forward end of the supporting plate 21.

Projecting upwardly from the rear end of base 10 is a standard 24 and passing through the upper portion thereof is a horizontally disposed screw 25. Nuts 26 located on said screw on both sides of the bracket enables the screw to be locked in differentially adjusted positions. Carried by the forward end of the screw 25 is a cushioning element or bumper 27, preferably of rubber, and the flat front face of which is disposed immediately adjacent the rear face of plate 16 that supports the rear end of the trough 22.

Passing through the upper portion of bracket 12 is a horizontally disposed screw 28 and carried thereby and adapted to engage the opposite faces of the bracket are nuts 29, by means of which the screw may be locked in differently adjusted positions. This screw projects toward plate 16 and carried by the end thereof is a disc 30. Interposed between disc 30 and the upper portion of plate 16 is an expansive coil spring 31 utilized for controlling the vibratory movement imparted to the trough 22 by the electromagnet 13.

Secured to and projecting upwardly from base 10 in front of bracket 12 is a bracket 32 and secured to the upper end thereof is the rear end of a horizontally disposed plate 33 of resilient metal. Secured to the forward portion of resilient plate 33 and projecting forwardly from the forward end of trough 22 is a plate 34 upon which is mounted the rear portion of a horizontally disposed trough 35 that is substantially U-shaped in cross section. The rear portion of this trough 35 is positioned beneath the forward portion of trough 22, and to prevent discharge of product from the rear end of trough 35 a transversely disposed rib or barrier 36 is secured on the rear portion of the bottom of said trough 35 beneath the forward end portion of trough 22.

Secured on the under side of the forward end of resilient plate 33 is an armature 37 and disposed immediately beneath said armature is a conventional electromagnet coil 38, the latter being supported by a bracket 39 that is secured to base 10.

Passing through the forward portion of base 10 is the lower portion of a vertically disposed screw 40, the same carrying nuts 41 that engage the top and bottom surfaces of base 10 so as to maintain the screw in differently adjusted positions, and carried by the upper end of this screw is a disc 42. Interposed between disc 42 and the under side of the forward portion of trough supporting plate 34 is an expansive coil spring 43.

In operation, the rear trough 22 is vibrated longitudinally as the result of the magnetic action of coil 13 on armature 17 that is carried by plate 16 and which latter supports the rear end of said trough. Plate 16 which is inflexible swings on the axis provided by shaft 14 and the ends of the latter rock to a very slight degree in the bearings 15. The vibratory movement thus imparted to plate 16 is yieldingly resisted in one direction by the rubber bumper 27 and in the opposite direction by the spring 31. Bumper 27 may be readily adjusted toward and away from plate 16 by manipulation of the nuts 26 on screw 25, thereby very accurately controlling the length of the vibratory strokes of the trough 22, and spring 31 may be likewise accurately adjusted by manipulation of the nuts 29 on screw 28 so as to regulate the tension of said spring and synchronize the vibrations imparted to the trough with the frequency of the current passing through electromagnet 13. The forward portion of trough 22 is resiliently supported by plate 19.

Thus the product or material that is being weighed and packaged and which is delivered into trough 22 will be caused to flow forwardly through said trough and to discharge into the rear portion of trough 35.

The electromagnet 38 acting on its armature 37 imparts vertical vibratory movement to the resilient plate 33 and trough 35 carried thereby and thus the product discharged into said trough from the forward end of trough 22 that is vibrated longitudinally, will be correspondingly vibrated vertically, and during such action said material will be caused to flow forwardly through trough 35 by the material or product discharged thereinto from trough 22.

This forward flow of the product or material through trough 35 is accomplished with very little effort due to the fact that the material or product while passing through said trough is vibrating vertically and as a result, the individual pieces or particles of the product are out of contact with the bottom of the trough 35, and under such conditions they are moved forwardly by the product discharging from trough 22 without frictional contact other than that between the individual particles which are all moving in the same direction.

From the forward end of the trough 35 the product or material discharges into containers such as C that are supported by the beam of the scales or weighing apparatus.

Spring 43 which in addition to plate 33 provides a resilient support for trough 35 may be adjusted by proper manipulation of the screw 40 and nuts 41, thus varying the tension of said spring and controlling the vibratory movement imparted to said trough.

It is to be understood that for the handling of certain materials and products that are being weighed and packaged, trough 22 and its vibrating means may be advantageously employed independently of trough 35 and its vibrating means.

It will be noted that in my improved conveyer, the inflexible plate 16 and resilient plate 19 that support the rear portion 22 of the trough are not inclined, but are vertically disposed, thus occupying positions at right angles to the bottom of the supported conveyer, and as a result, said conveyer during the forward stroke or travel of its vibratory movement moves forwardly and downwardly a slight distance rather than forwardly and upwardly, which result occurs where the supporting plates are inclined rearwardly.

Further, attention is particularly directed to the location of the means for vibrating the plate 16, which means including coil 13 and armature 17 are located a short distance only above the lower end of plate 16 and its axis of movement, the shaft 14. As a result of this low positioning of the vibratory means, the upper end of plate 16 and the trough 22 carried thereby have a longer vibratory stroke than if the vibrating means were mounted near the top or middle of plate 16, and such longer stroke results in greater speed of movement of the product through the trough.

Further, the low mounting of the coil and armature enables the same to be assembled with a relatively shorter gap between the armature and the core of the magnet, so that the latter has relatively greater power in its action upon the armature and with less current consumption than if the parts were assembled with a relatively wide gap.

Thus it will be seen that I have provided a vibrating conveyer trough that is relatively simple in construction, inexpensive of manufacture and very effective in performing the functions for which it is intended.

The two troughs, one disposed immediately in front of the other, in effect, function as a single trough, the rear portion of which is arranged to vibrate longitudinally to effect a forward flow of the material or product delivered into the rear portion of the trough and the front portion being arranged to vibrate vertically so that the product is caused to flow forwardly therethrough by the product that is delivered into said forward portion from the longitudinally vibrated rear portion, and which arrangement is effective in bringing about greater accuracy and uniformity of weight of the product delivered into the packages or containers that are carried by the scales or weighing apparatus.

It will be understood that minor changes in the size, form and construction of the various parts of my improved vibrating conveyer trough, may be made and substituted for those herein shown and described, without departing from the spirit of my invention, the scope of which is set forth in the appended claims.

I claim as my invention:

1. In a conveyer, a trough, a rocking support for the rear portion of said trough, which rocking support is pivoted at its lower end, a resilient support for said trough located in front of said rocking support, means for imparting vibrating movement to said rocking support, said supports being arranged so that said trough moves downwardly simultaneously with its forward movement and upwardly simultaneously with its rearward movement and adjustable means for controlling the vibratory movement to said rocking support in both directions.

2. In a conveyer, a trough, a rocking support for the rear portion of said trough, which rocking support is pivoted at its lower end, a resilient support for said trough arranged in front of said rocking support, means for imparting vibratory movement to said rocking support, said supports being arranged so that said trough moves downwardly simultaneously with its forward movement and upwardly simultaneously with its rearward movement and resilient means on both sides of said rocking support for cushioning the vibratory movement thereof in both directions.

3. In a coveyer, a pair of troughs, one disposed slightly below and in advance of the other, means for imparting longitudinal vibratory movement to the rear one of said troughs, means for cushioning the movement of said trough in both directions and means for imparting vertical vibratory movement to the forward one of said troughs.

4. A conveyer as set forth in claim 3 and means for yielding resisting downward vibratory movement of said forward trough.

5. In a conveyer, a trough, the bottom of which occupies a substantially horizontal plane, a plate disposed substantially at right angles to the bottom of said trough for supporting the rear portion thereof, the lower portion of which plate is mounted for rocking movement, a resilient plate arranged substantially at right angles to the bottom of the trough for supporting the intermediate portion thereof, said plate and resilient plate being arranged so that said trough moves downwardly simultaneously with its forward movement and upwardly simultaneously with its rearward movement, means for imparting vibratory movement to said first mentioned plate, a second trough arranged for operation at the discharge end of the first mentioned trough and means for imparting vertical vibratory movement to said second mentioned trough.

6. In a conveyer, a trough, the bottom of which occupies a substantially horizontal plane, a plate disposed substantially at right angles to the bottom of said trough for supporting the rear portion thereof, the lower portion of which plate is mounted for rocking movement, a resilient plate arranged substantially at right angles to the bottom of the trough for supporting the intermediate portion thereof, said plate and resilient plate being arranged so that said trough moves downwardly simultaneously with its forward movement and upwardly simultaneously with its rearward movement, electrical means for imparting vibratory movement to said first mentioned plate adjacent its axis of rocking movement, a second trough arranged for operation at the discharge end of the first mentioned trough and means for imparting vertical vibratory movement to said second mentioned trough.

7. In a conveyer, a trough, movable supports for said trough, one of which supports is vertically disposed and pivoted at its lower end so that said trough moves downwardly simultaneously with its forward movement and upwardly simultaneously with its rearward movement, means for imparting vibratory movement to said trough supporting means, a trough arranged for operation at the discharge end of said first mentioned trough, a horizontally disposed resilient support for said second mentioned trough and means for imparting vibratory movement to said horizontally disposed resilient support.

8. A conveyer as set forth in claim 7, with means for regulating the vibratory movement imparted to said first mentioned trough.

9. A conveyer as set forth in claim 7, with means for regulating the vibratory movement imparted to said second mentioned trough.

10. In a conveyer, a trough, an inflexible support rigidly fixed to the rear portion of said trough, the lower end of which support is pivoted and a resilient support for said trough disposed in front of said rocking support.

11. A conveyer as set forth in claim 10 and with means for imparting vibrating movement to said rocking support.

12. A conveyer as set forth in claim 10 and with a vertically movable trough arranged for operation at the discharge end of said first mentioned trough.

13. A conveyer as set forth in claim 10 with means for imparting vibrating movement to said rocking support and means for cushioning the vibrating movement of said rocking support.

THEODORE RAPP.